(12) United States Patent
Liao et al.

(10) Patent No.: US 11,631,272 B2
(45) Date of Patent: Apr. 18, 2023

(54) FINGERPRINT IDENTIFICATION DEVICE

(71) Applicant: Innolux Corporation, Miao-Li County (TW)

(72) Inventors: Hsiao Feng Liao, Miao-Li County (TW); Chuan-Chi Chien, Miao-Li County (TW); I-An Yao, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/210,491

(22) Filed: Mar. 23, 2021

(65) Prior Publication Data

US 2021/0334503 A1 Oct. 28, 2021

Related U.S. Application Data

(60) Provisional application No. 63/013,552, filed on Apr. 22, 2020.

(30) Foreign Application Priority Data

Nov. 26, 2020 (CN) .......................... 202011350324.X (51) Int. Cl.
*G06K 9/00* (2022.01)
*G06V 40/13* (2022.01)
(Continued)

(52) U.S. Cl.
CPC ...... *G06V 40/1318* (2022.01); *G02F 1/13338* (2013.01); *G02F 1/133308* (2013.01);
(Continued)

(58) Field of Classification Search
CPC ............. G06K 9/0004; G06K 9/00046; G06K 9/00161; G06K 9/00006; G06K 9/00033;
(Continued)

(56) References Cited

U.S. PATENT DOCUMENTS

2012/0218491 A1* 8/2012 Min ................... G02F 1/133308
349/58
2015/0301417 A1* 10/2015 Park .................. G02F 1/133553
349/42
(Continued)

FOREIGN PATENT DOCUMENTS

CN 107958237 4/2018
CN 109426784 3/2019
(Continued)

OTHER PUBLICATIONS

"Office Action of China Counterpart Application", dated Dec. 9, 2022, p. 1-p. 8.

*Primary Examiner* — Hoan C Nguyen
(74) *Attorney, Agent, or Firm* — JCIPRNET (57) ABSTRACT

A fingerprint identification module and a fingerprint identification device are provided. The fingerprint identification module includes a color filter substrate and a protective cover. The color filter substrate includes a first shading member. The protective cover is disposed on the color filter substrate and includes a second shading member. The second shading member faces the color filter substrate. There is a gap between the first shading member and the second shading member in a thickness direction of the fingerprint identification module, and the gap is within a range of 0.2 mm to 0.7 mm.

10 Claims, 5 Drawing Sheets

(51) Int. Cl.
  *G02F 1/1335* (2006.01)
  *G02F 1/1333* (2006.01)

(52) U.S. Cl.
  CPC .. *G02F 1/133512* (2013.01); *G02F 1/133514* (2013.01); *G02F 1/133528* (2013.01); *G02F 2201/50* (2013.01)

(58) Field of Classification Search
  CPC ............ G06K 9/00114; G06K 9/00087; G02F 1/133308; G02F 1/13338; G02F 1/133512; G02F 1/133514; G02F 1/133528; G02F 2201/50; G02F 1/133615; G06V 40/1318; G06V 40/12; G06V 40/13; G06V 40/172; G06F 3/0412; G06F 2203/0338; G06F 2203/04104; G06F 2203/0331; G06F 1/1684; G06F 1/1626; G06F 3/0421; G06F 2203/04109; A61B 5/1172; G01J 1/0233; G01J 1/0266; G01J 1/0219; G01J 1/58; G01J 5/10; G01J 1/08; G01J 2001/0257; G06T 11/003; G06T 2207/10048; G06T 2207/10008; G06T 2207/10; G01N 2201/061; G01N 2201/0638

See application file for complete search history.

(56) References Cited

U.S. PATENT DOCUMENTS

| | | | |
|---|---|---|---|
| 2017/0372113 A1* | 12/2017 | Zhang | G06K 9/2036 |
| 2017/0372114 A1 | 12/2017 | Cho et al. | |
| 2018/0151641 A1* | 5/2018 | Choo | H01L 27/323 |
| 2018/0275454 A1* | 9/2018 | Yasumoto | G02F 1/133308 |
| 2020/0019804 A1* | 1/2020 | Kim | G09G 3/32 |

FOREIGN PATENT DOCUMENTS

| | | |
|---|---|---|
| CN | 110208982 | 9/2019 |
| CN | 209625231 | 11/2019 |

* cited by examiner

FINGERPRINT IDENTIFICATION DEVICE

CROSS-REFERENCE TO RELATED APPLICATION

This application claims the priority benefit of U.S. provisional application Ser. No. 63/013,552, filed on Apr. 22, 2020 and China application serial no. 202011350324.X, filed on Nov. 26, 2020. The entirety of each of the above-mentioned patent applications is hereby incorporated by reference herein and made a part of this specification.

BACKGROUND

Technical Field

The disclosure relates to an optical module and an electronic product, and more particularly to a fingerprint identification module and a fingerprint identification device.

Description of Related Art

With the rapid development of technology, more and more electronic products such as mobile phones, digital cameras, personal computers, and notebook computers have become essential tools in daily lives. The electronic products often store important information, such as phone books, photos, or documents. Since the fingerprint has a high degree of unity, the fingerprint identification devices are gradually adopted in more and more electronic products. After the fingerprint identification device records the fingerprints of the user, the user does not need to remember a specific password. Therefore, the risk of the password being stolen or broken is reduced.

SUMMARY

The disclosure provides a fingerprint identification module and a fingerprint identification device, which can effectively reduce the size of a device or reduce manufacturing costs.

According to an embodiment of the disclosure, the fingerprint identification module includes a color filter substrate and a protective cover. The color filter substrate includes a first shading member. The protective cover is disposed on the color filter substrate, and includes a second shading member. The second shading member faces the color filter substrate. There is a gap between the first shading member and the second shading member in the thickness direction of the fingerprint identification module, and the gap is within a range of 0.2 mm to 0.7 mm.

In order for the features and advantages of the disclosure to be more comprehensible, the following specific embodiments are described in detail with the accompanying drawings.

DETAILED DESCRIPTION OF DISCLOSED EMBODIMENTS

The disclosure may be understood through referring to the following detailed descriptions in conjunction with the accompanying drawings. It should be noted that in order for the reader to easily understand and to simplify the drawings, multiple drawings in the disclosure only draw a part of an electronic product/display product, and specific elements in the drawings are not drawn according to actual scale. In addition, the number and size of each element in the drawings are only for illustration, and are not intended to limit the scope of the disclosure. For example, for the sake of clarity, the relative size, thickness, and position of each layer, region, or structure may be reduced or enlarged.

Throughout the disclosure and the appended claims, certain words are used to refer to specific elements. Persons skilled in the art should understand that electronic equipment manufacturers may refer to the same element with different names. The disclosure is not intended to distinguish the elements with the same function but different names. In the following descriptions and claims, terms such as "comprising", "having" and "including" are open-ended terms, which should be interpreted as the meaning of "including but not limited to . . . ".

In the disclosure, directional terms such as "upper", "lower", "front", "rear", "left", and "right" are only directions with reference to the drawings. Therefore, the directional terms used are for illustration, but not to limit the disclosure. It should be understood that when an element or a layer is referred to as being "on" or "connected to" another element or layer, the element or layer may be directly on the other element or layer or directly connected to the other element or layer, or there may be an intervening element or a layer inserted between the two (indirect case). On the contrary, when an element or a layer is referred to as being "directly on" or "directly connected to" another element or layer, there is no intervening element or layer inserted between the two.

In the disclosure, terms "approximately", "equal to", "equivalent", "same", "substantially", or "roughly" generally represent a value falling within a range of 10% of a given value, or falling within a range of 5%, 3%, 2%, 1%, or 0.5% of the given value. In addition, terms "a given range is from a first value to a second value" and "the given range falls within a range of the first value to the second value" represent that the given range includes the first value, the second value, and other values in between.

In some embodiments of the disclosure, terms such as "disposed", "connected" and "interconnected", may refer to that two structures are in direct contact, or that two structures are not in direct contact and there is another structure located between the two structures, unless specifically defined. These terms may also include the case where the two structures are both movable or the two structures are both fixed. In addition, terms such as "electrical connection" and "coupling" include any direct and indirect electrical connection means.

In the following embodiments, the same or similar elements will adopt the same or similar reference numerals, and the reiteration thereof will be omitted. In addition, the features in different embodiments may be arbitrarily mixed and matched as long as there is no violation of the spirit of the invention or conflict therebetween, and simple equivalent changes and modifications made in accordance with the specification or claims are still within the scope of the disclosure. In addition, terms such as "first" and "second" mentioned in the specification or claims are only used to name different elements or to distinguish different embodiments or ranges, and are not intended to limit the upper or lower limit of the number of elements or to limit the manufacturing sequence or arrangement sequence of the elements.

The electronic product of the disclosure may include a display product, an antenna product, a sensing product, a light emitting product, or a tiled product, but not limited thereto. The electronic product may include a bendable or flexible electronic product. The electronic product may, for example, include a liquid crystal layer or a light emitting diode (LED). The LED may include, for example, an organic LED (OLED), a mini LED, a micro LED, or a quantum dot LED (QLED or QDLED), fluorescence, phosphor, other suitable materials, or a combination of the above, but not limited thereto. Hereinafter, a fingerprint identification device will be used as the electronic product to illustrate the content of the disclosure, but the disclosure is not limited thereto.

FIG. 1 to FIG. 5 are respectively fingerprint identification devices according to multiple embodiments of the disclosure. Please refer to FIG. 1 first. The embodiment provides a fingerprint identification device 10. The fingerprint identification device 10 may include a fingerprint identification module 100, a light source 20, and a sensing module 30, but not limited thereto. The light source 20 may be configured to provide a light beam L. The light beam L may be configured for fingerprint identification, but not limited thereto. The light beam L emitted from the light source 20 can pass through fingerprint identification module 100, and the light beam L can be transmitted to a finger F of the user. The finger F reflects the light beam L to generate a light beam L' with fingerprint information. The light beam L' with the fingerprint information can pass through the fingerprint identification module, and the light beam L' can be transmitted to the sensing module 30. The sensing module 30 receives the light beam L' to perform fingerprint identification.

Figure 1:
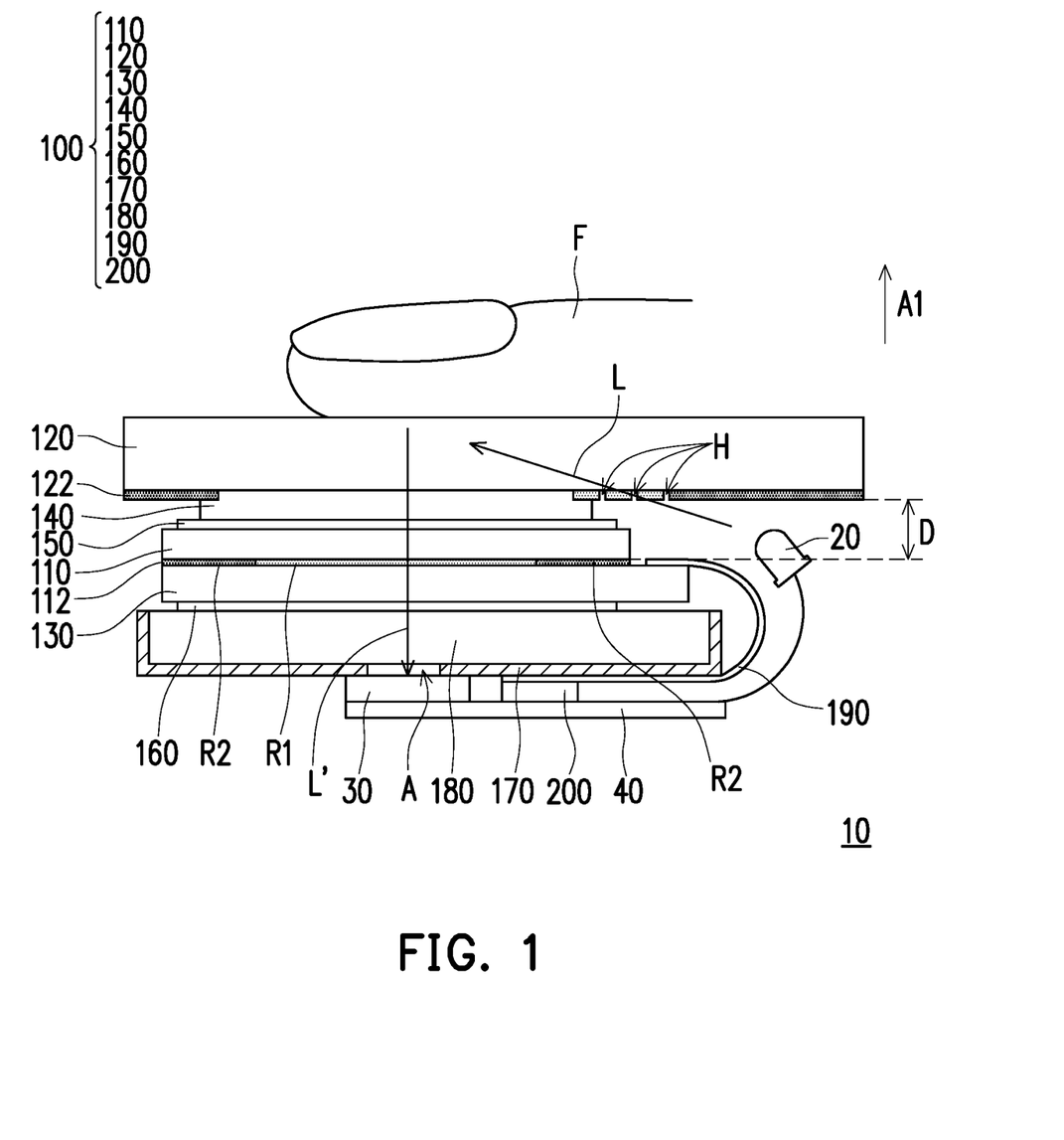
FIG. 1 to FIG. 5 are respectively fingerprint identification devices according to multiple embodiments of the disclosure.

In some embodiments, the fingerprint identification module 100 may include a display module, such as a self-luminous display module or a non-self-luminous display module. The self-luminous display module may include a LED, a light conversion layer, other suitable materials, or a combination of the above, but not limited thereto. The LED may include, for example, an OLED, a mini LED, a micro LED, or a QLED (or QDLED), but not limited thereto. The light conversion layer may include a wavelength conversion material and/or a light filter material. The light conversion layer may include, for example, fluorescence, phosphor, quantum dots, other suitable materials, or a combination of the above, but not limited thereto. The non-self-luminous display module may include a liquid crystal display module, but not limited thereto. Hereinafter, the liquid crystal display module serves as the display module to illustrate the content of the disclosure, but the disclosure is not limited thereto.

In detail, the fingerprint identification module 100 may include a color filter substrate 110 and a protective cover 120. The color filter substrate 110 may, for example, include a first shading member 112. The first shading member 112 may be located on one side of the color filter substrate 110 and away from the protective cover 120, but not limited thereto. The first shading member 112 may include a black matrix (not shown) located in an active region R1 and a shading pattern (not shown) located in a peripheral region R2. In some embodiments, although not shown, the color filter substrate 110 may also include filter patterns of multiple colors, such as a red filter pattern, a green filter pattern, and a blue filter pattern, but not limited thereto. The filter patterns of multiple colors are located in the active region R1 to provide a color display screen.

The protective cover 120 may be disposed on the color filter substrate 110 and may include a second shading member 122. The second shading member 122 faces the color filter substrate 110. In other words, the second shading member 122 may be located on a side of the protective cover 120 facing the color filter substrate 110. The second shading member 122 may be used to beautify the appearance or shield the elements or circuits underneath that are not intended to be seen by the user.

In some embodiments, the fingerprint identification module 100 may further include an active element array substrate 130 for controlling the gray scale of the display screen. The active element array substrate 130 may be disposed under the color filter substrate 110, and the first shading member 112 may be located on a side of the color filter substrate 110 adjacent to the active element array substrate 130. It should be noted that in some embodiments, filter patterns of multiple colors, such as a red filter pattern, a green filter pattern, and a blue filter pattern, may be disposed on the active element array substrate 130. At this time, the active element array substrate 130 may be regarded as the color filter substrate.

In some embodiments, the fingerprint identification module 100 may further include an optical layer 140. The optical layer 140 may be disposed between the color filter substrate 110 and the protective cover 120. For example, the optical layer 140 may be an optically clear adhesive (OCA), and the color filter substrate 110 may be attached to the protective cover 120 through the optical layer 140, but the disclosure is not limited thereto.

In some embodiments, the fingerprint identification module 100 may further include an upper polarizer 150 and a lower polarizer 160. The upper polarizer 150 may be disposed on the color filter substrate 110 and may be located between the optical layer 140 and the color filter substrate 110. The lower polarizer 160 may be disposed adjacent to the active element array substrate 130, and the active element array substrate 130 may be located between the color filter substrate 110 and the lower polarizer 160.

Under the architecture that the fingerprint identification module 100 includes the liquid crystal display module, the fingerprint identification module 100 may further include a liquid crystal layer (not shown) located between the color filter substrate 110 and the active element array substrate 130 and a backlight module 180. The type of the liquid crystal layer may be changed according to requirements, and there is no limitation here. The backlight module 180 may be disposed under the lower polarizer 160 and may be configured to provide an illumination beam (not shown). The type of the backlight module 180 may be changed according to requirements, and there is no limitation here. In addition, if the display module is a self-luminous display module, the backlight module 180 may not be required.

In some embodiments, the fingerprint identification module 100 may further include a frame body 170. The frame body 170 may be configured to accommodate the backlight module 180. In some embodiments, the material of the frame body 170 may include metal, alloy, or a combination thereof to facilitate heat dissipation, but not limited thereto. The frame body 170 has a light transmitting opening A. The light transmitting opening A exposes the sensing module 30, and the light beam U with the fingerprint information can be transmitted to the sensing module 30.

In some embodiments, the fingerprint identification module 100 may further include a signal line carrier 190 and a chip 200. The signal line carrier 190 may be electrically connected to the active element array substrate 130 and may be bent and fixed to the back surface of the frame body 170. The chip 200 may be disposed on the signal line carrier 190 fixed to the back surface of the frame body 170 and may be electrically connected to the signal line carrier 190.

The light source 20 may be disposed under the protective cover 120. The light source 20 may include an infrared LED, but not limited thereto. In other embodiments, the light source 20 may include an infrared LED, a visible light LED, or a combination of the above, that is, the light beam L emitted by the light source 20 may include infrared, visible light, or a combination of the above. The light source 20 may be configured to emit the light beam L toward the gap between the first shading member 112 and the second shading member 122. To be more specific, there is a gap between the first shading member 112 and the second shading member 122 in a thickness direction A1 of the fingerprint identification module 100, and the gap may be a distance D, and the light beam L may pass through from the gap between the first shading member 112 and the second shading member 122. In some embodiments, the distance D is in a range of 0.2 mm to 0.7 mm (0.2 mm≤D≤0.7 mm), or is in a range of 0.3 mm to 0.65 mm (0.3 mm≤D≤0.65 mm). It should be noted that, as shown in FIG. 1, the distance D may be the result obtained by summing up the maximum thickness of the substrate (such as the color filter substrate 110) located on the active element array substrate 130, the upper polarizer 150, and the optical layer 140 in the thickness direction A1, and then subtracting the maximum thickness of the second shading member 122 in the thickness direction A1. Moreover, when other layers are added between the first shading member 112 and the second shading member 122, the thicknesses of the layers will also be included when calculating the distance D. The light beam L emitted by the light source 20 may be, for example, obliquely incident into the gap between the first shading member 112 and the second shading member 122. In some embodiments, the included angle between the transmission direction of the light beam L and the thickness direction A1 of the fingerprint identification module 100 is within a range of 65° to 89° (65°≤included angle≤89°) or is within a range of 67° to 85° (67°≤included angle≤85°). It should be noted that when the light emitted by the light source 20 is not completely concentrated into a light beam, the transmission direction of the light beam L refers to the transmission direction of the portion with the strongest energy among light emitted by the light source 20 toward various directions. By designs such as disposing the light source 20 under the protective cover 120 and the light beam L emitted by the light source 20 being obliquely incident into the gap between the first shading member 112 and the second shading member 122, it is not necessary to dispose the light source 20 close to the lateral side of the protective cover 120, and it is not necessary to dispose an optical coating on the protective cover 120 to reflect the light beam L. Therefore, it may effectively reduce the sizes or the costs of the fingerprint identification module 100 and the fingerprint identification device 10.

In some embodiments, the second shading member 122 may include multiple light transmitting holes H. The multiple light transmitting holes H are disposed on the transmission path of the light beam L emitted from the light source 20 to allow the light beam L to pass through, thereby further increasing the light intensity of the light beam L irradiated to the finger F. In another embodiment, the second shading member 122 may be made of a material that allows the light of a certain range of wavelength to pass through and shields the light of the remaining range of wavelength, and the manufacture of the multiple light transmitting holes H may be omitted. In different embodiments, a part of the second shading member 122 having the multiple light transmitting holes H as shown in FIG. 1 may also be designed to have materials suitable for different ranges of wavelength or to have different types of optical structures to allow the light beams L with different conditions (such as different wavelengths) to pass through, and the disclosure is not limited thereto.

The sensing module 30 may be disposed under the fingerprint identification module 100. The sensing module 30 may include photosensitive elements such as a charge coupled device (CCD) or a complementary metal oxide semiconductor transistor (CMOS), but the disclosure is not limited thereto.

According to different requirements, the fingerprint identification device 10 may also include other elements or layers. For example, the fingerprint identification device 10 may further include a circuit carrier 40. The light source 20 and the sensing module 30 are both electrically connected to the circuit carrier 40 to acquire power supply. The circuit carrier 40 may include a printed circuit board (PCB) or a flexible printed circuit (FPC), but not limited thereto.

In the following embodiments, the same or similar elements will adopt the same or similar reference numerals, and the reiteration thereof will be omitted. In addition, the features in different embodiments may be arbitrarily mixed or combined as long as there is no violation of the spirit of the invention or conflict therebetween, and simple equivalent changes and modifications made in accordance with the specification or claims are still within the scope of the disclosure.

Figure 2:
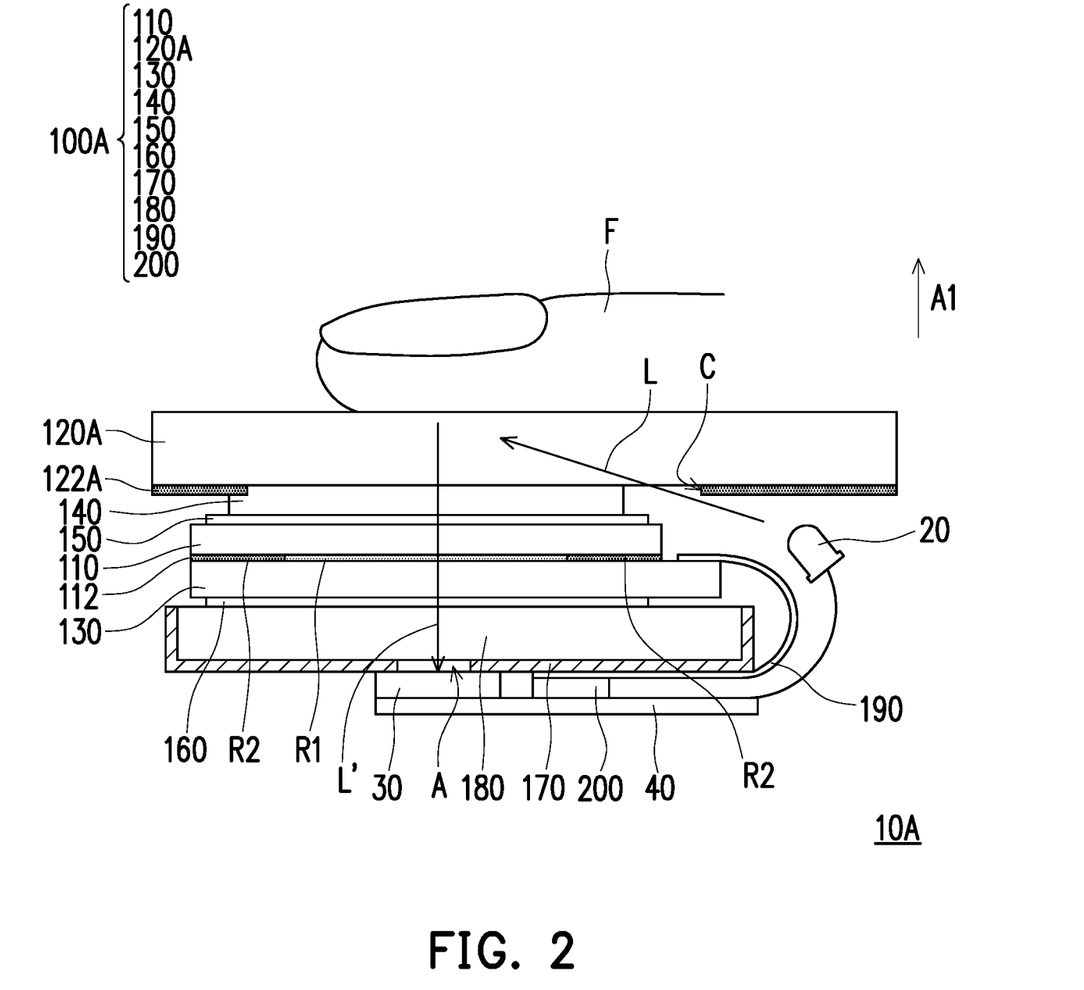

Please refer to FIG. 2. A fingerprint identification device 10A of the present embodiment may be similar to the fingerprint identification device 10 shown in FIG. 1. The difference between the two is that a protective cover 120A of the fingerprint identification module 100A of the present embodiment is different, and at least one inner edge C of a second shading member 122A does not overlap the first shading member 112 in the thickness direction A1. In other words, compared to the second shading member 122 shown in FIG. 1, the inner edge (that is, the inner edge C) of the second shading member 122A in the present embodiment retracts outward. Therefore, the light beam L may be transmitted to the finger F without passing through the second shading member 122A. In this way, the light intensity of the light beam L irradiated to the finger F may be further increased, and the emission wavelength of the light beam L provided by the light source 20 does not need to be limited. In another embodiment, the total thickness of the optical layer 140 and the color filter substrate 110 may also be increased to increase the amount of incident light, and the light irradiated area of the fingerprint may also be increased, and there is no need to additionally increase the space inside the fingerprint identification device 10A, but the disclosure is not limited thereto.

Figure 3:
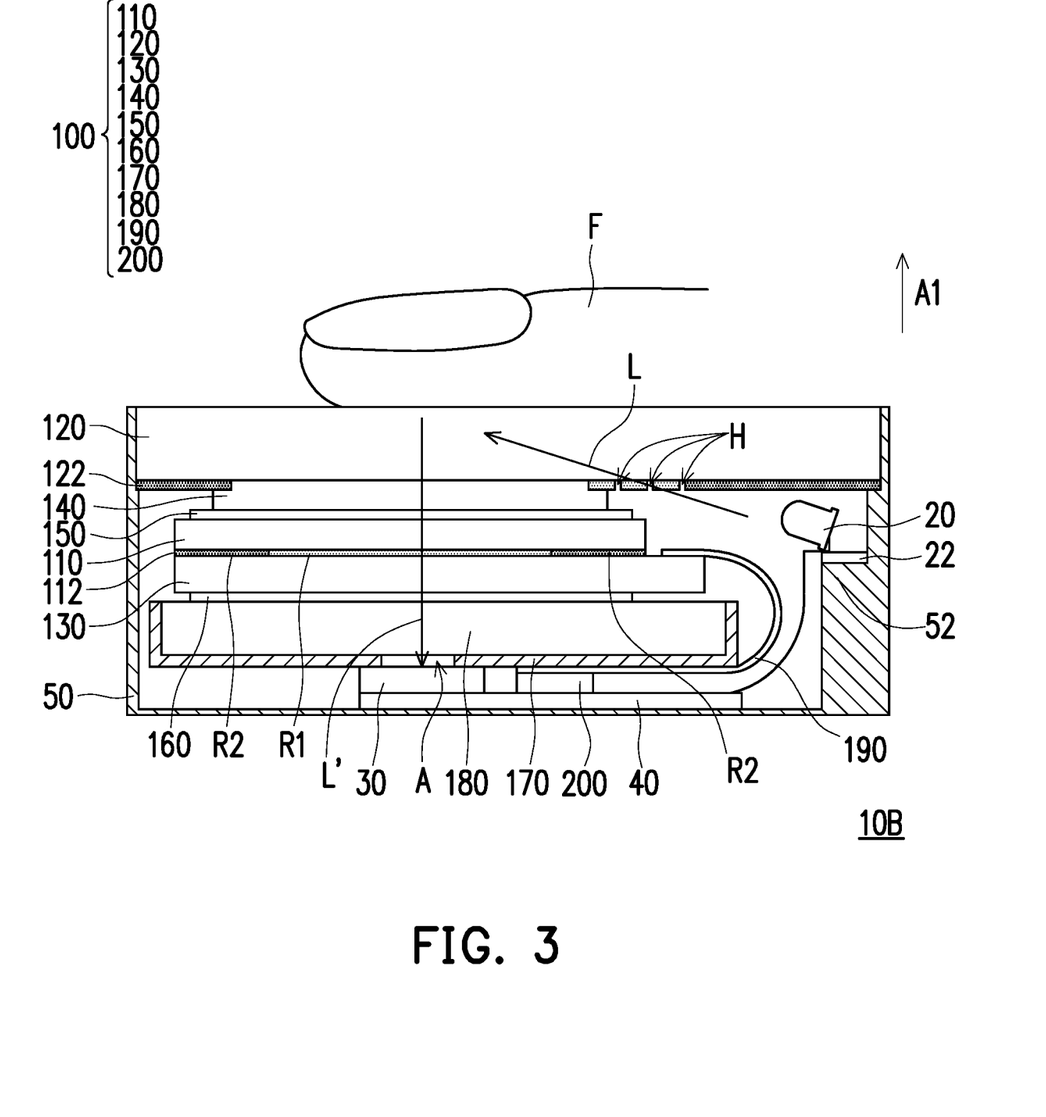

Please refer to FIG. 3. A fingerprint identification device 10B of the present embodiment may be similar to the fingerprint identification device 10 shown in FIG. 1. The difference between the two is that the fingerprint identification device 10B of the present embodiment further includes a middle frame 50 for accommodating the fingerprint identification module 100, the light source 20, the sensing module 30, and the circuit carrier 40. In some embodiments, the middle frame 50 may also be configured to carry the protective cover 120. In detail, the middle frame 50 has a platform part 52, and the light source 20 may be disposed on the platform part 52. For example, the light source 20 may be connected to the platform part 52 by an adhesive member 22. The platform part 52 may be formed by forming a hole in the middle frame 50, but the disclosure is not limited thereto. With such design, the internal space of the fingerprint identification device 10B may be properly utilized, and there is no need to additionally increase the space inside the fingerprint identification device 10B in order to accommodate the light source 20. In different embodiments, the angle of the light emitted from the light source 20 may also be adjusted by the angle of the platform part 52, and the disclosure is not limited thereto.

Figure 4:
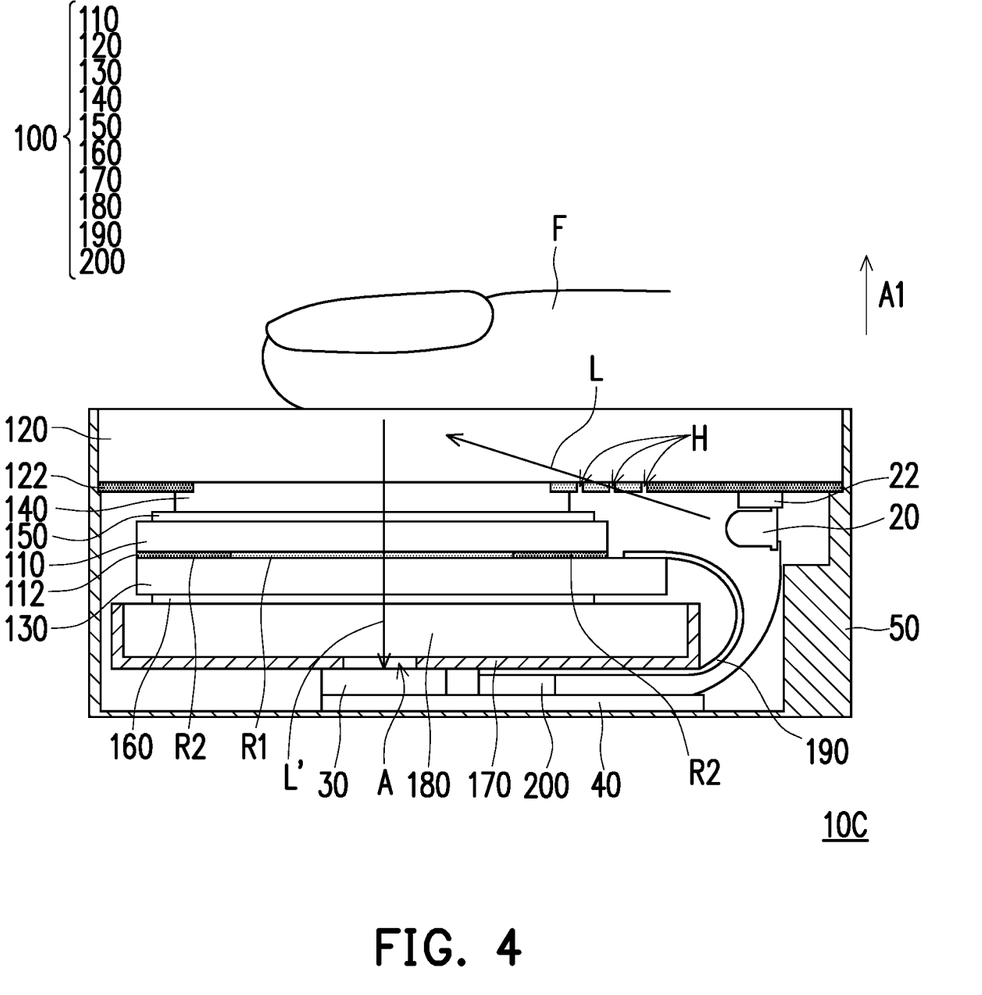

Please refer to FIG. 4. A fingerprint identification device 10C of the present embodiment may be similar to the fingerprint identification device 10B shown in FIG. 3. The difference between the two is that in the fingerprint identification device 10C of the present embodiment, the light source 20 may be connected to the bottom part of the protective cover 120 by the adhesive member 22. With such design, the internal space of the fingerprint identification device 10C may be properly utilized, and there is no need to additionally increase the space inside the fingerprint identification device 10C in order to accommodate the light source 20.

Figure 5:
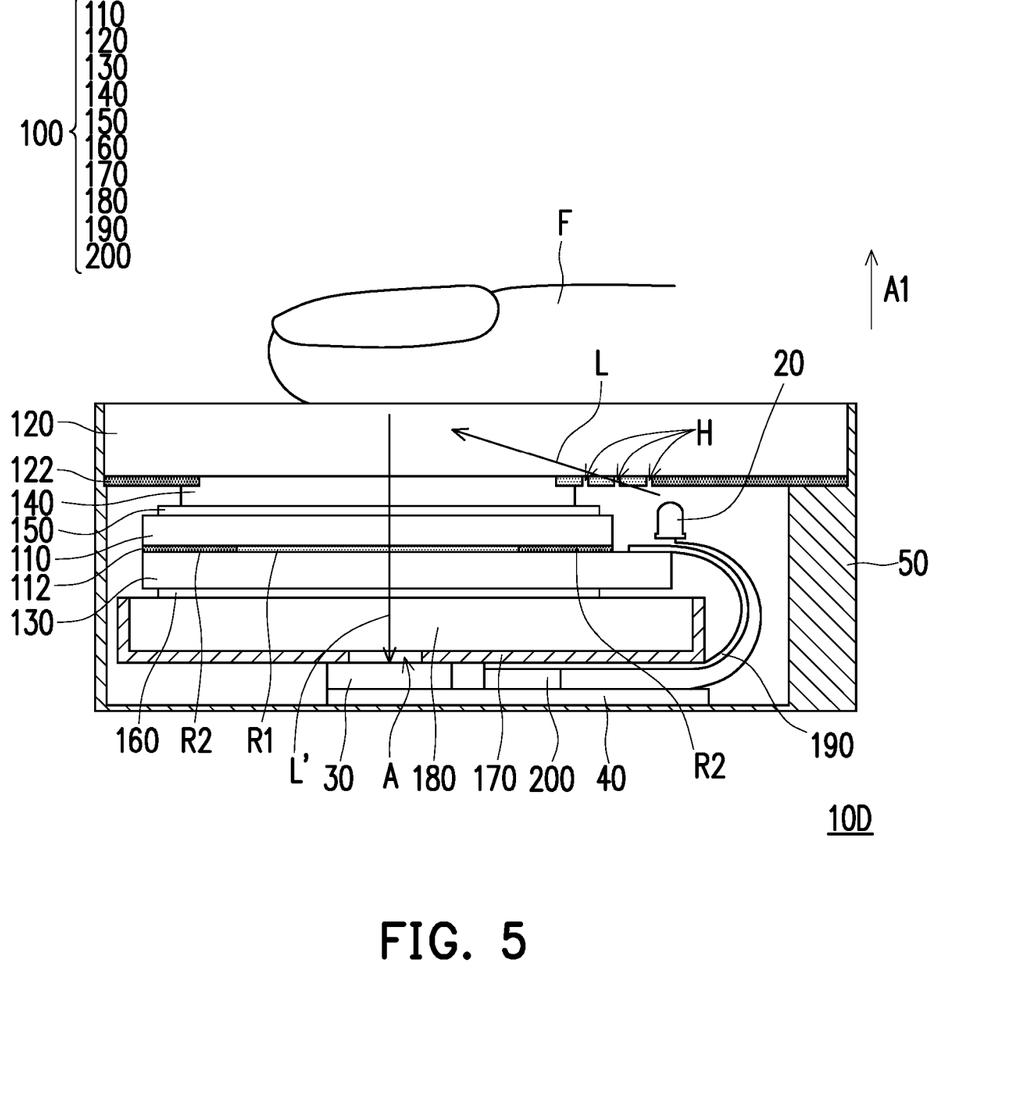

Please refer to FIG. 5. A fingerprint identification device 10D of the present embodiment may be similar to the fingerprint identification device 10B shown in FIG. 3. The difference between the two is that in the fingerprint identification device 10D of the present embodiment, the light source 20 may be disposed in the space between the protective cover 120 and the active element array substrate 130. For example, the light source 20 may be disposed on the signal line carrier 190, but is not limited thereto. With such design, the internal space of the fingerprint identification device 10D may be properly utilized, and there is no need to additionally increase the space inside the fingerprint identification device 10D in order to accommodate the light source 20.

In summary, in the embodiments of the disclosure, the fingerprint identification device includes the fingerprint identification module, the light source, and the sensing module. The fingerprint identification module includes the color filter substrate having the first shading member and the protective cover having the second shading member. The first shading member and the second shading member keep a distance in the thickness direction of the fingerprint identification module, and the distance is within a range of 0.2 mm to 0.7 mm. The light beam may be transmitted to the finger of the user from between the first shading member and the second shading member, and the light source does not need to be disposed at the side of the protective cover. In addition, the protective cover does not need to be equipped with an optical coating to reflect the light beam. In this way, the size of the fingerprint identification module may be reduced or manufacturing costs may be effectively reduced.

The above embodiments are only used to illustrate, but not to limit, the technical solutions of the disclosure. Although the disclosure has been described in detail with reference to the foregoing embodiments, persons skilled in the art should understand that they may still modify the technical solutions described in the foregoing embodiments, or equivalently replace some or all of the technical features. The modifications or replacements do not cause the essence of the corresponding technical solutions to deviate from the scope of the technical solutions of the embodiments of the disclosure.

Although the embodiments of the disclosure and the advantages thereof have been disclosed as above, it should be understood that persons skilled in the art may make changes, substitutions, combinations, and modifications without departing from the spirit and scope of the disclosure, and the features between the embodiments may be arbitrarily mixed or replaced with other new embodiments. In addition, the protection scope of the disclosure is not limited to the manufacturing processes, machines, manufacturing, material compositions, devices, methods, and steps in the specific embodiments described in the specification. Persons skilled in the art should understand that the content of the disclosure may be used as long as the current or to-be-developed processes, machines, manufacturing, material compositions, devices, methods, and steps may implement substantially the same functions or obtain substantially the same results according to the embodiments described in the disclosure. Therefore, the protection scope of the disclosure includes the manufacturing processes, machines, manufacturing, material compositions, devices, methods, and steps. In addition, each claim constitutes a separate embodiment, and the protection scope of the disclosure also includes the combination of various claims and embodiments. The protection scope of the disclosure shall be determined by the appended claims.

What is claimed is:

1. A fingerprint identification device, comprising:
    a fingerprint identification module, comprising:
        a color filter substrate, comprising a first shading member;
        a protective cover, disposed on the color filter substrate and comprising a second shading member,
        wherein the second shading member faces the color filter substrate, there is a gap between the first shading member and the second shading member in a thickness direction of the fingerprint identification module, and the gap is within a range of 0.2 mm to 0.7 mm;
    a light source, configured to emit a light beam toward the gap between the first shading member and the second shading member; and
    a sensing module, disposed under the fingerprint identification module and configured to receive the light beam.

2. The fingerprint identification device according to claim 1, wherein an included angle between a transmission direction of the light beam and the thickness direction is within a range of 65° to 89°.

3. The fingerprint identification device according to claim 1, wherein the light source is an infrared light emitting diode.

4. The fingerprint identification device according to claim 1, wherein the light source is disposed under the protective cover.

5. The fingerprint identification device according to claim 1, wherein the second shading member comprises a plurality of light transmitting holes.

6. The fingerprint identification device according to claim 1, wherein at least one inner edge of the second shading member does not overlap the first shading member in the thickness direction of the fingerprint identification module.

7. The fingerprint identification device according to claim 1, further comprising:

a circuit carrier, wherein the light source and the sensing module are electrically connected to the circuit carrier.

8. The fingerprint identification device according to claim 1, further comprising:
a middle frame, configured to carry the protective cover and having a platform part, wherein the light source is disposed on the platform part.

9. The fingerprint identification device according to claim 1, further comprising:
an adhesive member, wherein the light source is connected to a bottom part of the protective cover by the adhesive member.

10. The fingerprint identification device according to claim 1,
wherein the fingerprint identification module further comprises a signal line carrier, and the light source is disposed on the signal line carrier.

* * * * *